No. 644,375. Patented Feb. 27, 1900.
N. STEFFES.
PLOW FENDER.
(Application filed Aug. 9, 1899.)
(No Model.)
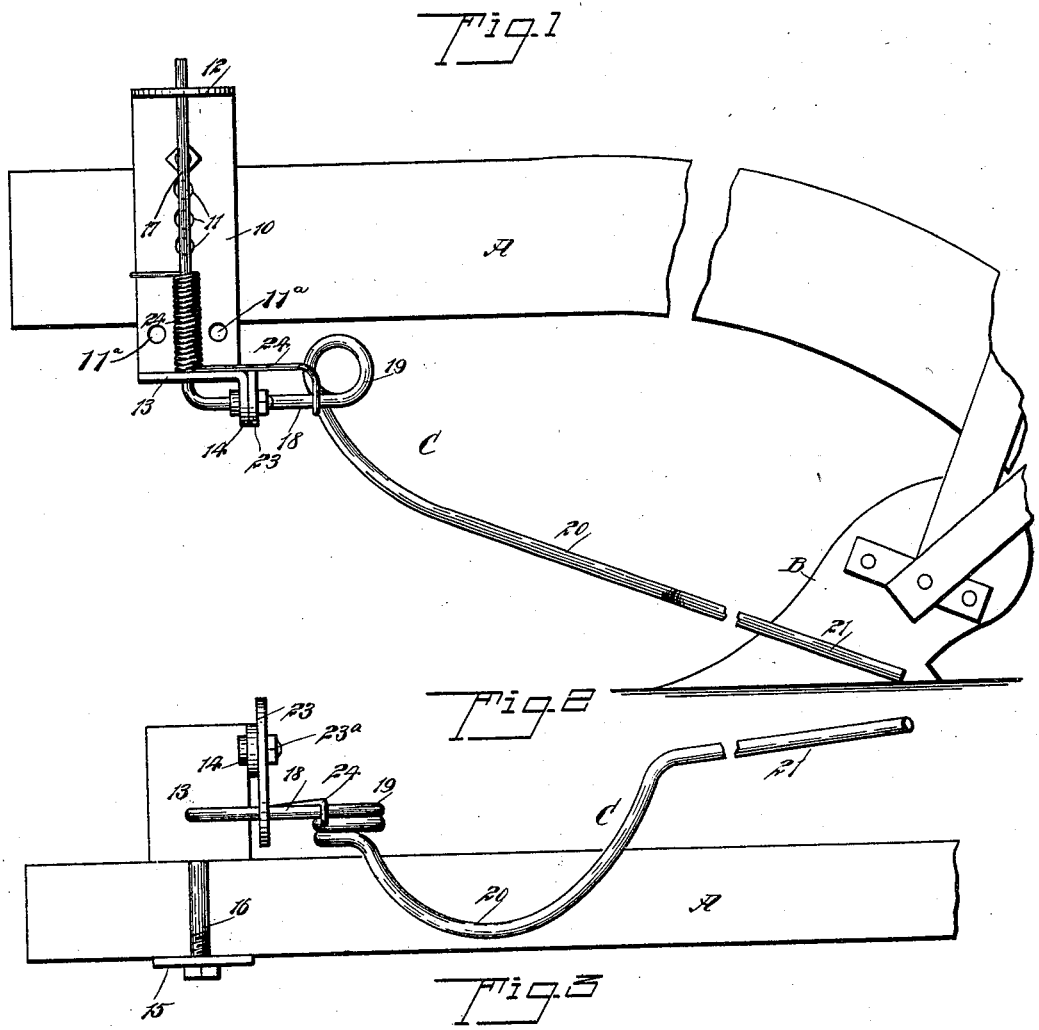
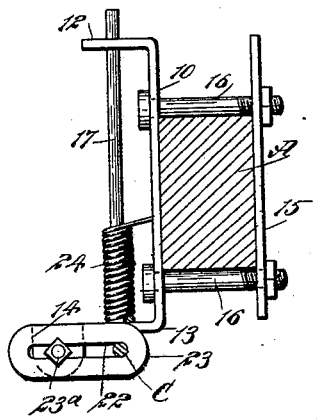
WITNESSES:
INVENTOR
N. Steffes
BY
ATTORNEYS

UNITED STATES PATENT OFFICE.

NICHOLAS STEFFES, OF DARLINGTON, WISCONSIN.

PLOW-FENDER.

SPECIFICATION forming part of Letters Patent No. 644,375, dated February 27, 1900.

Application filed August 9, 1899. Serial No. 726,690. (No model.)

*To all whom it may concern:*

Be it known that I, NICHOLAS STEFFES, of Darlington, in the county of Lafayette and State of Wisconsin, have invented a new and Improved Plow-Fender, of which the following is a full, clear, and exact description.

The object of my invention is to provide a plow-fender in the nature of a weed-turner and adapted to be located at the land side of a plowshare, which fender is so constructed that it will prevent straw, manure, or weeds from being drawn forward with the plow. By thus preventing the rolling or dragging action of the straw, manure, &c., such obstacles are covered better than heretofore and left evenly distributed wherever they may be, either in the furrow or at the edge of the next furrow. Thus the plow runs lighter, because it is always clean and free from rubbish.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the plow beam and share and a side elevation of the improved device applied to the plow-beam. Fig. 2 is a bottom plan view of the plow-beam and the device, and Fig. 3 is a vertical transverse section through the device and through the plow-beam.

The plow-beam A may be of any desired material or may be given any necessary shape, and the plowshare B is that of the usual type. The body-plate 10 of the attachment is adapted to engage with the land side face of the plow-beam and to extend above and below the said beam, and the said body-plate is provided with a series of apertures 11 and 11ᵃ and with an outwardly-extending upper member 12 and a corresponding lower member 13, both of which members are at a right angle to the body. The lower member 13 at its rear side is provided with a downwardly-extending lug 14. The body-plate is attached to the beam A, preferably through the medium of a binding-plate 15, which engages with the said beam, at the moldboard side thereof, as shown in Fig. 3, and bolts 16, which pass through the body-plate and through the binding-plate, one above and the other below the beam, as is also shown in Fig. 3. These bolts 16 have suitable nuts applied thereto. The upper bolt 16 passes through one of the upper apertures 11 in the body-plate 10 and through a slot in the binding-plate 15, and the lower bolt passes through a lower aperture 11ᵃ in the body-plate, the apertures being in the arc of a circle, and through an aperture in the binding-plate 15, which construction enables the device to be adjusted to beams of different dimensions and to be placed diagonally upon the beams.

The weed-turner C consists of a rod of stout spring material, usually steel, and comprises a vertical shank member 17, which is passed through suitable openings in the upper and lower members 12 and 13 of the body or supporting plate 10, and a horizontal rearwardly-extending member 18 below the body or supporting plate, which horizontal member 18 terminates in one or more coils 19. In the further formation of the weed-turner a curved section 20 immediately follows the coil 19, and this curved section 20 is carried beneath the plow-beam, in direction of the moldboard side thereof, while the rear end of the curved section 20 extends to any desired distance of the land side face of the plow-beam, as shown in Fig. 3, and finally a drag-section 21 immediately follows the curved section 20, and this drag-section extends downwardly and rearwardly adjacent to the land side of the plow B.

In order that the space between the weed-turner and the land side of the plow may be regulated as occasion may demand, the horizontal section 18 of the weed-turner is passed through a slot 22, produced in an elongated plate 23, and said plate is adjustably attached through the medium of a suitable bolt or its equivalent to the lug 14, extending from the lower member 13 of the body or supporting plate 10, as is best shown in Fig. 3. A spring 24 is coiled around the shank-section 17 of the weed-turner, and one end of the said spring has bearing against the body or supporting plate 10, while the other end of the spring bears against the outer face of the horizontal section 18 of the weed-turner, as shown in Fig. 1. This spring tends to normally hold the drag-section of the weed-turner in desired position, while the coil 19 enables the drag-section of said weed-turner to readily pass over any great obstruction it may encounter. The curved section of the weed-turner C clears the straw or stalks from in front of the plow, while the drag-section 21 thereof holds such material down adjacent to the land side of the plow, permitting the plow to make a required furrow without difficulty.

Having thus described my invention, I claim as new and desire to secure by Letters Patent—

1. In a plow-fender, a rod adapted to extend from a point opposite the plowshare to the plow-beam, and a body-plate for said rod, said plate having outwardly-extending upper and lower members formed with openings to receive said rod, the said plate being further provided with a vertically-extending series of apertures and a horizontally-extending series therebelow, adapted to receive bolts whereby to attach the plate to the plow-beam, as set forth.

2. In a plow-fender, a support adapted for attachment to a plow-beam, a rod having a shank mounted in said support said rod extending rearwardly from said shank, a plate secured to said support and having an elongated slot in which said rod is received, and a spring bearing against said rod whereby to hold the latter at one end of said slot, as set forth.

3. In a plow-fender, a support arranged for attachment to a plow-beam, a rod having a shank mounted in said support, the said rod extending rearwardly from said shank, a plate adjustable horizontally on said support and having a slot receiving said rod whereby the latter may be adjusted laterally, as set forth.

4. In a plow-fender, a body-plate arranged for attachment to a plow-beam and having outwardly-extending upper and lower members, the lower member being provided with a lug, a rod having a shank mounted in said members, a plate adjustably secured to said lug and formed with an elongated slot receiving said rod, and a spring coiled around said shank and tending to hold said rod at one end of said slot, as set forth.

5. In a plow-fender, a support adapted for attachment to a plow-beam at the land side face thereof, a resilient rod adjustably carried by the said support, said rod comprising a shank-section, a horizontal section terminating in a coil, an intermediate curved section adapted to extend beneath a plow-beam in direction of the working side thereof, and a drag-section adapted to be located adjacent to the land side of the plow, and means for adjusting the said rod, as described.

6. In a plow-fender, a body-plate arranged for attachment to a plow-beam, and a rod attached to said body-plate, the said rod being adjustable laterally on said plate and spring-pressed in one direction, as set forth.

NICHOLAS STEFFES.

Witnesses:
CLARANCE D. BREES,
E. T. W. BARNES.